June 13, 1961   S. C. KOMROSKY   2,988,109
POPPET CONTROLLED GATE VALVE
Filed March 26, 1959   2 Sheets-Sheet 1

INVENTOR.
Stanley C. Komrosky
ATTORNEYS

June 13, 1961 S. C. KOMROSKY 2,988,109
POPPET CONTROLLED GATE VALVE
Filed March 26, 1959 2 Sheets-Sheet 2

INVENTOR.
Stanley C. Komrosky
BY
Christy, Parmelee & Strickland
ATTORNEYS

United States Patent Office 2,988,109
Patented June 13, 1961

2,988,109
POPPET CONTROLLED GATE VALVE
Stanley C. Komrosky, 1496 Oak Ave., Glenshaw, Pa.
Filed Mar. 26, 1959, Ser. No. 802,209
4 Claims. (Cl. 137—630.15)

This application is a continuation-in-part of application Ser. No. 575,855, filed Apr. 3, 1956, and which has matured into Patent No. 2,879,800.

The present invention is concerned generally with gate valves for the control of fluid flowing therethrough under high pressures. More specifically the invention is concerned with a gate valve having a fluid pressure actuated sealing member mounted on the gate for selective control of flow of fluid pressure through the valve and provided with means for readily equalizing pressure on opposite sides of said gate sealing member prior to rotation of the gate to a position permitting unimpeded flow of fluid through the valve.

In the valve of the invention the rotatable gate has a movable member housed wholly within the gate permitting unimpeded free rotation of the gate from open to closed position. The sealing member is initially extensible from within the gate into sealing engagement with the valve outlet and is thereafter held in sealing pressure by fluid pressure within the valve. Said sealing member has associated therewith a small poppet type control means whereby the poppet is initially retracted to equalize pressure on opposite sides of the sealing member before retracting the sealing member out of engagement with the valve housing outlet opening.

One object of the invention is to provide a valve of the character described for control of a wide range of fluid pressures with the same speed and ease of operation of the valve. Another object of the invention is to provide a valve of the character described which may be constructed of inter-changeable parts made with nominal tolerances on standard machine tools without grinding or lapping of said parts.

Another object of the invention is to provide a gate valve of the character described which may be readily moved from open to closed position and thereafter utilizing fluid pressure to retain the valve sealed in closed position.

A further object of the invention is to provide a gate valve for control of high fluid pressures having a low turning torque in moving the valve gate, making possible the use of small inexpensive operators for remote automatic operation.

These and other objects of the invention will be made apparent from the following specification and the drawings forming a part thereof, wherein.

Figure 1:
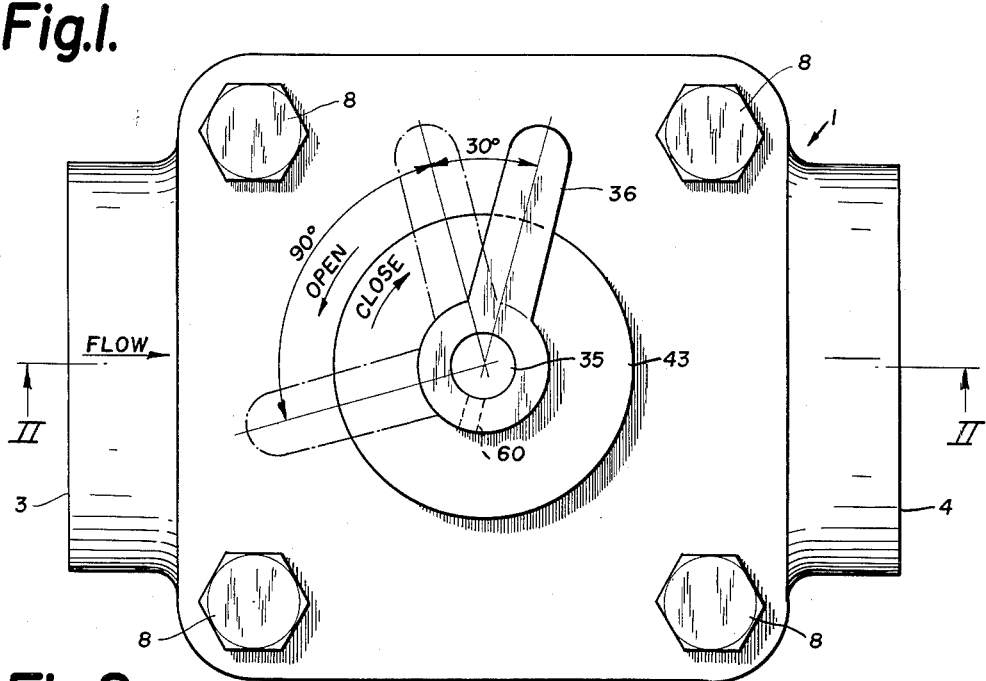
FIG 1 shows a plan view of the valve, illustrating movement of the handle in turning gate from closed to open position.

Referring now in detail to the drawings, where a presently preferred form of the invention is disclosed, reference character 1 indicates the valve generally comprising a housing 2 provided with an inlet port 3 and an outlet port 4. The housing 2 provides a hollow substantially cylindrical enclosure 5 within which is mounted the valve gate 6. The upper portion of the housing is closed by a removable cover 7 which is secured in place by suitable means such as the machine screws 8.

The valve gate, indicated generally by reference character 6, comprises a substantially spherical body portion having flattened top and bottom surfaces. The bottom surface 9 has an opening 10 therein on the vertical axis of the gate to receive an up-standing pivot 11 on the inner face of the bottom wall 12 of the housing. Preferably the pivot 11 is provided with a shoulder 13 upon which the gate 6 is supported. Preferably a suitable ring-shaped shim of either steel or brass is mounted on the pivot 11 and supported by the shoulder 13 thereof, providing a bearing support for the gate 6. The top surface 15 of the gate 6 is flattened and provided with a shoulder portion 16. Concentric with one longitudinal axis of the gate 6 is a passageway 17 for flow of fluid through the valve. Said passageway being substantially the same diameter as the diameter of the end of the inlet passageway 3 and the similar inner end 19 of the outlet passageway 4.

At one side of the outer face of gate 6 on the longitudinal axis of the gate at right angles to the longitudinal axis of the gate passageway 17 is an annular recess 20 having at its upper portion a connecting rearwardly extending passageway 21, for a purpose hereinafter discussed. Slidably mounted in the recess 20 is an annular pressure member 22 having an arcuate outer face 23 and inner face 24. The inner and outer faces 23 and 24 are connected by the peripheral wall 25 slidably mounted within the corresponding peripheral walls of the recess 20. The inner face 24 of the pressure member 22 is disposed in spaced relation to the inner face 26 of the recess 20 and forms therewith a pressure chamber. Extending through the member 22 is a suitable opening 27 connecting the faces 23 and 24 of the member 22. Opening 27 at its inner end is enlarged to receive a poppet. Movably mounted within the enlarged inner end of the opening 27 is a poppet member 28 which is movable into and out of engagement with the peripheral walls of the outer end of opening 27 to open and close the said opening. The inner end of opening 27 forms part of a vertical recess in member 22 for a purpose hereinafter discussed. Extending transversely of the gate 6 above the passageway 17 therein is a passageway 29 connecting the recess 21 with the opposite peripheral wall of the gate 6. Slidably mounted within the passageway 29 and extending from one end thereof is a finger member 30 which is slightly smaller than the passageway and has a downwardly extending portion 31 disposed within the recess 20 and vertical recess of member 22. A suitable aperture 32 of the poppet member 28 receives the end of portion 31 for mounting member 28 therein. The member 30 actuates the poppet 28 into and out of engagement with the opening 27 in the pressure member 22. The outer face 23 of the pressure member 22 is provided with an annular recess in which is mounted a sealing member 33, preferably an O-ring which seals against the inner ends of the walls 19 defining the inner end of the outlet opening 4. Preferably these outlet walls 19 are in the form of a hollow annular insert 34 mounted in a suitable recess in the valve housing 2.

Figure 2:
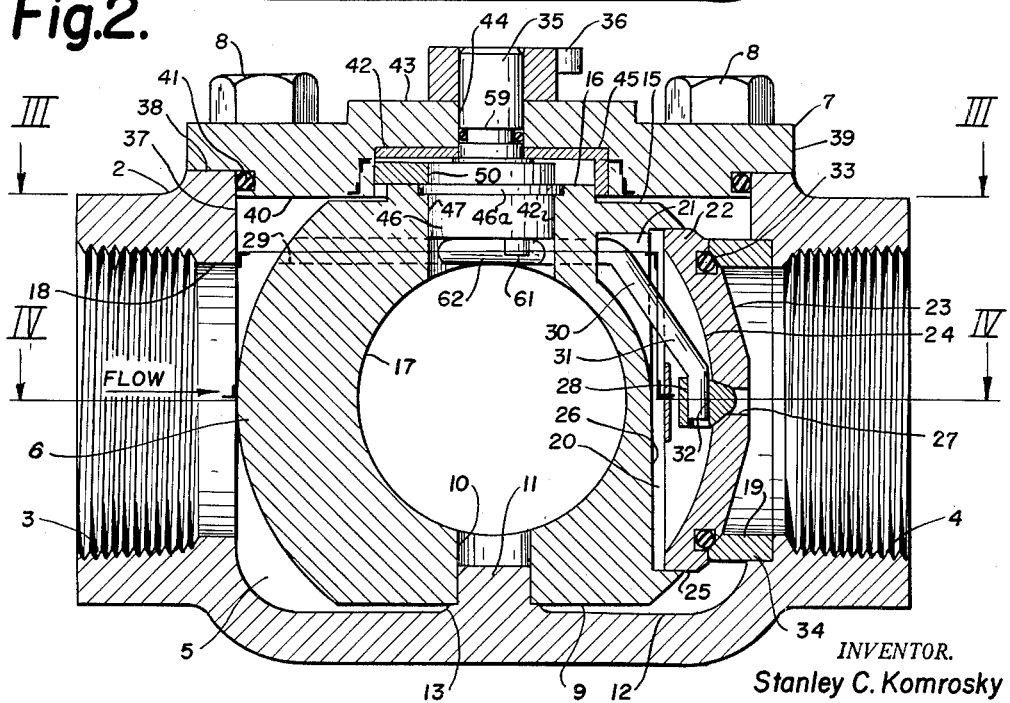
FIG. 2 shows a section through the valve taken on lines II—II of FIG. 1.
Figure 3:
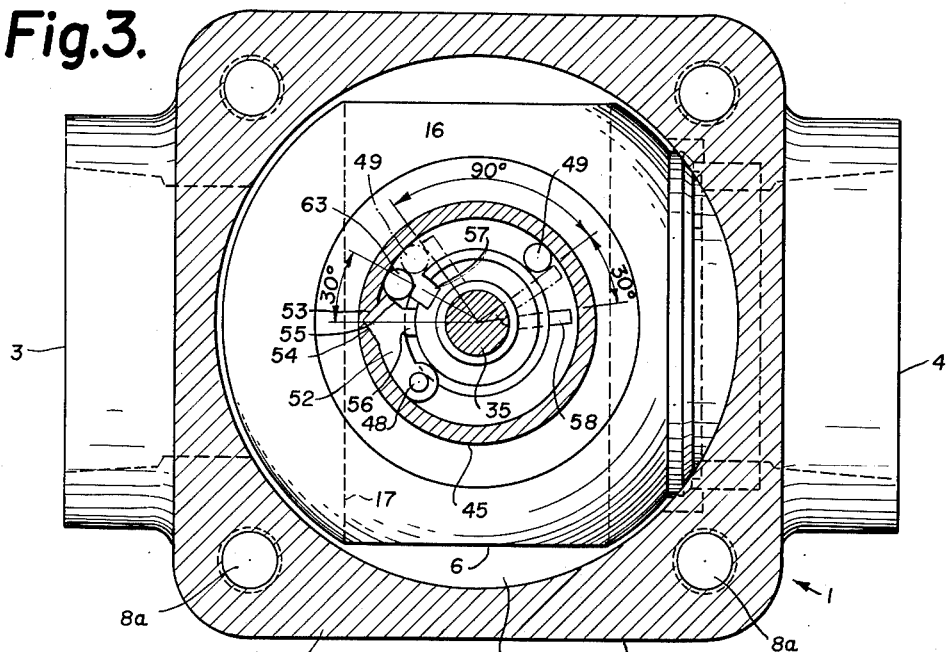
FIG. 3 shows a section taken on lines III—III of FIG. 2 illustrating the latch connection between the operating spindle and gate providing for independent movement of the gate pressure sealing member.

As best shown in FIGS. 2 and 3 of the drawing, selective rotation of the valve gate 6 is provided by a spindle 35 mounted in the gate 6 and cover 7. The spindle 35 has a handle 36 mounted thereon and disposed above the cover 7. The housing 2 of the valve has an annular opening 37 therein to the hollow enclosure 5 of the housing, which opening 37 is surrounded by a rectangular embossment 38, having the threaded openings 8a therein to receive the cap screws 8. The cover 7 has shoulder portions 39 supported on the housing embossment 38 and provided with an annular embossment 40 which extends into the housing opening 37 in spaced relation thereto. The embossment 40 being preferably enclosed by a suitable sealing member such as the O-ring 41. Cover 7 at embossment 40, and concentric with the vertical axis of the gate 6, is provided with an annular recess 42. On the upper face of the cover 7 is an embossment 43 provided with an annular passageway 44 opening into the recess 42. Preferably the recess 42 is provided with an annular liner 45, and the gate surface 16 extends upwardly within the liner 45. The spindle 35 has a portion 46 thereof rotatably mounted in the passageway 47 of the valve gate 6, which passageway is concentric with the vertical axis of the valve gate. A collar 46a surrounds the portion 46 and is preferably recessed into the surface 16 of the valve gate. As best shown in FIG. 3 of the drawings the flattened gate surface 16 is provided with an upwardly extending pivot pin 48. Substantially diametrically opposite the pin 48 is a stop pin 49 extending upwardly from the surface 16 of the gate. Pivotally mounted on the pin 48 is a latch member 50 having an aperture 51 receiving the pin 48. The latch 50 has an arcuate face 52 conforming to and lying adjacent the inner face of the cover liner 45. Extending upwardly from the face 52 of the latch is a projection portion 53 adapted to be received in a suitable recess 54 in the liner 45. Outwardly of the portion 53, the latch is provided with an inclined portion 55 and a depending projection 56 which is receivable in a slot 57 in the portion 46 of the valve spindle 35. Extending laterally from the spindle portion 35 is a pin 58 adapted to engage the stop pin 49. The spindle portion 35 extending upwardly through the aperture 44 of the cover 7 is preferably provided with an annular recess 59 within which is mounted a suitable O-ring projecting slightly outwardly beyond the periphery of the spindle portion 35 so as to seal against the side walls of the cap aperture 44. The handle portion 36 is suitably secured to the spindle portion 35 by any suitable means such as the set screw 60.

The valve of the drawing is shown with the gate 6 positioned to cut off flow of fluid under pressure through the valve. The gate when so positioned has the passageway 17 therethrough disposed at right angles to the oppositely disposed inlet and outlet openings of the valve housing and with the sealing member and poppet valve in sealing relation to the inner end of the valve outlet 4. The valve gate 6 in moving between open and closed position rotates on its vertical axis through an angle of 90°. The valve handle in so moving the valve gate moves through an arc of 120°. This additional 30° movement of the valve handle is accomplished independently of any movement of the valve gate and is necessary to move the poppet 28 and valve gate sealing member 23 into and out of sealing position with relation to the valve outlet 4.

Referring now to FIGS. 1 to 3 inclusive, FIG. 1 shows the movement of the operating handle 36 between valve closed and valve open position; FIG. 2 is a vertical transverse section through the valve of FIG. 1, showing the gate in sealing position and FIG. 3 is a section through the gate operating spindle of FIG. 2, showing the mechanism providing for independent movement of the spindle 35 relative to the valve gate 6 and for subsequent concurrent movement therewith.

Referring now to FIG. 2 of the drawings, wherein the valve gate is shown in sealing position, the pressure member face 23 of the gate is in sealing engagement with the inner face of the walls 19 of valve housing outlet 4 and must be retracted inwardly of the gate before the gate can be operated. This initial movement of member 23 is provided by the projection 61 on the base of spindle 35 moving in engagement with the slotted opening 62 in the member 30.

Figure 4:
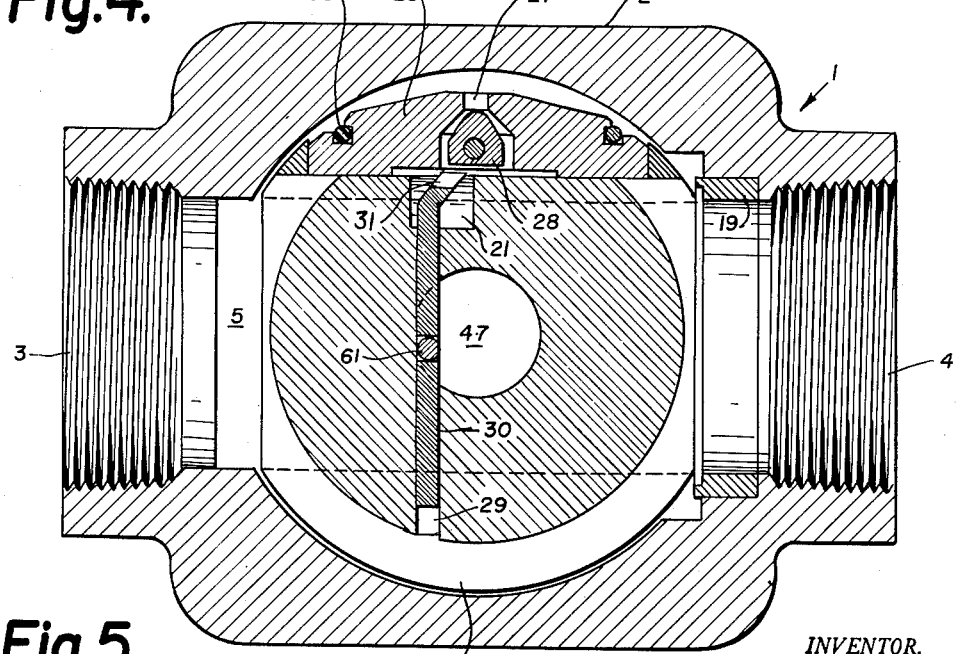
FIG. 4 shows a section taken on lines IV—IV of FIG. 2 illustrating position of valve gate when in open position; and, FIG. 5 shows details of the control latch associated with the spindle.
Figure 5:
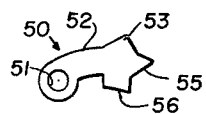

In FIG. 3 of the drawing is shown the latching arrangement permitting initial rotation of the spindle 35 independently of the gate and thereafter concurrent therewith. With the valve gate in closed position, as shown in FIG. 2, the latch 50 pivotally mounted on pin 48 fixed on the valve gate 6, has its portion 55 in engagement with the pin 63 fixed on the cover and its projection 53 seated in the recess 54 of the cover liner 45. Upon initial counter-clockwise rotation of the spindle 35, by means of the handle 36, the spindle portion 46 rotates in a counter-clockwise direction, independently of the gate 6, through an arc of 30° to position the slot 57 therein into alignment with the projection 56 of the latch 50. At the end of this 30° independent rotation of the spindle the pin 58 projecting laterally therefrom engages with the stop 49 mounted upon the gate. Thereafter the spindle and the valve gate by reason of engagement of pin 58 and stop 49, move concurrently. During this concurrent movement of the spindle and gate, the latch pivot pin 48 fixed to the gate imparts counter-clockwise motion to the latch 50, withdrawing the latch portion 53 from engagement with the cover liner 45 and engages the latch portion 56 and the slot 57 in the spindle portion 46. Continued concurrent movement of the spindle and valve carries the stop pin 49 on the valve gate into engagement with the stop pin 63 on the cover preventing further rotation of the gate which is now positioned, as shown in FIG. 4, with the passageway 17 within the gate aligned with the inlet and outlet openings 3 and 4 respectively of the valve housing, permitting flow of fluid through the housing and gate.

When it is desired to move the valve gate from open to closed position, the handle 36 is rotated in a clockwise direction through an angle of 90° disposing the valve gate pressure member 22 into longitudinal alignment with the inner face of the walls 19 of the housing outlet 4. During this concurrent movement of the spindle and valve gate, the latch member 50 rotating concurrently with the gate and in a clockwise direction advances the latch portion 55 into engagement with the cover stop pin 63 so as to lift the latch portion 56 out of engagement with the slot 57 of the spindle and bringing the latch portion 53 into engagement with the recess 54 in the cover liner 45. During such concurrent movement, gate stop pin 49 returns to the position shown in FIG. 3. The gate 6 being thus stopped from further rotation, the spindle 35 being freed of the latch, now rotates independently. During this independent rotation, of an additional 30°, by the spindle, the portion 61 depending therefrom engages with the end of the slot 62 in a member 30 and advances the member 30 bodily to the right as shown in FIG. 2 of the drawings. This movement of the member 30 advances the poppet member 28 mounted on the member 30, into engagement with the opening 27 in the pressure member 23 and thereafter continued movement of the member 30 advances the member 23 into engagement with the outlet opening of the housing with the O-ring sealing member 33 engaging with the inner face of the walls 19 of housing outlet 4.

During this latter described movement the flow of fluid through the valve housing is impeded by the closed wall of the gate presented to the inner face of the housing inlet opening 3, but due to clearance between the periphery of the gate 6 and the walls of the hollow enclosure 5 of the housing the fluid flows around the gate into the space between the housing enclosure walls and the member 22. At the same time such fluid flowing through the opening 29 of the gate housing the member 30 flows into the slot 21 and pressure chamber 20 in back of the member 23 so as to add the force of the fluid pressure against the inner wall 24 of the member 22 increasing the sealing pressure of the O-ring 33 upon the housing outlet walls 19 and maintained contact therewith independently of continued pressure applied through the handle. Thus the valve gate is retained in closed position by fluid pressure within the valve housing entering pressure chamber 20 behind valve gate pressure member 22 and retaining same in contact with the outlet opening of the casing.

The valve has been shown and described as to a presently preferred form of the invention but the details of construction are subject to many variations without departing from the invention. The retractable pressure sealing member on one face of the valve gate and the poppet member associated therewith may take more than one form and still remain mechanical equivalents of that disclosed herein. The means providing initial independent actuation of said sealing member and poppet member and subsequent concurrent rotation thereof with the valve gate may also be varied to suit design needs. The means for admitting line pressure into the chamber housing the pressure sealing member can also be varied to suit design conditions.

The distinguishing features of the invention include positive sealing of the valve outlet opening by the pressure sealing member and the equalizing of pressure on opposite sides of the pressure sealing member before retraction in preparation for rotation of the valve. These features make for low torque turning effort in rotating the valve, as well as to utilize line pressure in retaining the valve sealed in closed position instead of relying upon continued torque effort from the handle. Thus, this valve is capable of spring closing for "fail-safe" operation, or use of small, inexpensive operators for remote, automatic operation. This pressure sealing of the valve in closed position also eliminates the necessity for close tolerance machining of the valve parts. The poppet member disclosed may be of metal or other suitable material to provide a "hard" or "soft" face thereon for sealing in the pressure sealing member. By removing the cover only, all internal valve parts including the seat, may be removed and replaced without removing the valve casing from the line.

The valve of the invention, having the gate passageway concentric with and of substantially the same cross-sectional area as that of the line in which it is mounted, reduces pressure drop in the line when the valve is open and permits ready passage of line scrubbers.

In the design illustrated the line pressure is admitted to pressure chamber 20 through the channel 29 within the gate receiving the operating member 30. It will be apparent, however, that the gate, not requiring a close fit within the enclosure 5, may be provided with other passageways admitting line pressure into the pressure chamber 20.

I claim:

1. In a rotary gate valve, in combination, a housing having walls defining a hollow enclosure having valve inlet and outlet openings in the housing walls, a substantially spherical gate pivotally mounted within said enclosure, a circular fluid passageway extending through said gate, a recess in the outer face of said gate and between the ends of the said passageway, means on said gate and housing for selectively aligning said gate passageway with said housing openings and said gate recess with the housing outlet opening, a sealing member movably mounted in said gate recess for advancement into sealing engagement with said housing outlet opening and retraction therefrom, said sealing member having an opening extending therethrough for alignment with said housing outlet opening, a second passageway through said gate above said fluid passageway, a poppet actuating member freely slidably mounted within said gate second passageway and having one end thereof extending into said gate recess behind said sealing member, a poppet member supported by said end of the actuating member in alignment with said sealing member opening and means on said gate actuating means slidably engaging said poppet actuating member, said gate second passageway admitting fluid pressure from said housing around said poppet actuating member into said gate recess behind said sealing member.

2. The gate valve as defined in claim 1 wherein said housing is provided with a removable wall portion for insertion and removal of the assembly of the gate, sealing member, poppet and poppet actuating member.

3. The gate valve as defined in claim 1 wherein the means for aligning said gate with said housing openings is mounted in said removable housing wall.

4. In a rotary gate valve, in combination, a housing having top and bottom walls and connecting side walls providing a hollow enclosure, said top wall having an opening therethrough and a cover member removably secured to said top wall closing said opening, a substantially spherical gate insertable through said housing top wall opening and pivotally mounted in said housing hollow enclosure, an inlet opening and an outlet opening provided in said housing side walls, a passageway extending through said gate, the outer face of said gate having a recess therein intermediate the ends of said gate passageway, a sealing member movably mounted within said gate recess, the front face of said sealing member having a surface for sealing engagement with said housing outlet opening, a vertically extending recess on the rear face of the sealing member opening into said gate recess, a passageway in said sealing member connecting the recess therein with the front sealing surface of the member, a poppet member mounted in said sealing member recess in alignment with said passageway therein, a sealing member actuating member slidably mounted in said gate and having an angularly disposed portion extending into said sealing member recess for reciprocal movement therein, means connecting said sealing member actuating member and poppet, means mounted in said cover member for rotating said gate and moving said sealing member actuating member, said cover having an annular recess in the inner face thereof, an annular shoulder portion on said gate extends into said cover recess, said cover and gate shoulder having registering openings therein on the vertical axis of the gate, a spindle rotatably mounted in said gate shoulder opening and having a reduced end portion extending through said cover opening, a member depending from said spindle into engagement with said sealing member actuating member for imparting limited reciprocal sliding movement thereto, a latch member pivotally mounted on said gate shoulder and movable therewith within said cover recess, means on said latch and spindle for selective engagement providing concurrent rotation of the spindle and gate, means on said cover and latch for actuating said latch into and out of engagement with said spindle, and means on said spindle and gate engaging for concurrent rotation when the latch and spindle are in engagement.

References Cited in the file of this patent

UNITED STATES PATENTS

| | | |
|---|---|---|
| 2,577,725 | Drake | Dec. 11, 1951 |
| 2,879,800 | Komrosky | Mar. 31, 1959 |